US012654802B2

(12) United States Patent
Li et al.

(10) Patent No.: US 12,654,802 B2
(45) Date of Patent: Jun. 16, 2026

(54) FOLDING SCOOTER

(71) Applicant: INTRADIN (SHANGHAI) MACHINERY CO., LTD., Shanghai (CN)

(72) Inventors: Ping Li, Shanghai (CN); Yonggang Zhou, Shanghai (CN)

(73) Assignee: INTRADIN (SHANGHAI) MACHINERY CO., LTD., Shanghai (CN)

( * ) Notice: Subject to any disclaimer, the term of this patent is extended or adjusted under 35 U.S.C. 154(b) by 409 days.

(21) Appl. No.: 18/493,580

(22) Filed: Oct. 24, 2023

(65) Prior Publication Data

US 2024/0051637 A1 Feb. 15, 2024

(30) Foreign Application Priority Data

Jul. 31, 2023 (CN) .......................... 202322038297.8

(51) Int. Cl.
B62K 15/00 (2006.01)
A61G 5/08 (2006.01)

(52) U.S. Cl.
CPC .......... B62K 15/006 (2013.01); A61G 5/0808 (2016.11); B62K 2015/001 (2013.01)

(58) Field of Classification Search
CPC ............ B62K 15/006; B62K 2015/001; A61G 5/0808
See application file for complete search history.

(56) References Cited

U.S. PATENT DOCUMENTS 6,851,498 B1 * 2/2005 Sauve ...................... B60N 2/24
280/639

FOREIGN PATENT DOCUMENTS

| CN | 205661605 U | 10/2016 | |
| CN | 205769858 U | * 12/2016 | ........... B62K 15/006 |
| CN | 206141721 U | 5/2017 | |

* cited by examiner

*Primary Examiner* — Jacob D Knutson

(57) ABSTRACT

A folding scooter, including a handle assembly, a support plate assembly, a seat and a connecting assembly. The seat is detachably provided on the support plate assembly. The connecting assembly is configured to achieve the rotational connection between the handle assembly and the support plate assembly. The connecting assembly includes a connecting plate, a hinge shaft and a fixing plate. In this application, the hinge shaft is located below the support plate assembly, such that when the folding scooter is folded, the rotational axis of the handle assembly is located below the support plate assembly, thereby enabling the handle assembly to closely cling to the support plate assembly.

9 Claims, 12 Drawing Sheets

A

500

510

520

FOLDING SCOOTER

CROSS-REFERENCE TO RELATED APPLICATIONS

This application claims the benefit of priority from Chinese Patent Application No. 202322038297.8, filed on Jul. 31, 2023. The content of the aforementioned application, including any intervening amendments thereto, is incorporated herein by reference in its entirety.

TECHNICAL FIELD

This application relates to walking-assisted tools, and more particularly to a folding scooter.

BACKGROUND

Scooters can greatly help those suffering from mobility problems do outdoor activities, such as traveling and camping. In some cases, it is necessary to fold the scooter for subsequent transport.

However, most of the existing scooters are folded from the middle of the support plate, which results in a larger thickness in a folded state, thereby leading to large space occupation and inconvenient storage and transport.

SUMMARY

Accordingly, an object of the present disclosure is to provide a folding scooter which has a flat structure and less space occupation when folded.

Technical solutions of the disclosure are described as follows.

This application provides a folding scooter, comprising:
a handle assembly;
a support plate assembly;
a seat; and
a connecting assembly;
wherein the seat is detachably provided on the support plate assembly;
the connecting assembly is configured to achieve rotational connection between the handle assembly and the support plate assembly, and comprises a connecting plate, a hinge shaft and a fixing plate; the hinge shaft is located below the support plate assembly; the fixing plate is fixedly arranged relative to the support plate assembly, and is connected to the hinge shaft; and a first end of the connecting plate is connected to the handle assembly, and a second end of the connecting plate is articulatedly connected to the hinge shaft; and
the handle assembly is configured to rotate around the hinge shaft with the connecting plate in a direction close to or away from the seat to allow folding or unfolding of the handle assembly relative to the support plate assembly.

Compared to the prior art, this application has the following beneficial effects.

During the folding process of the folding scooter of this application, the seat is removed firstly, and then the handle assembly is driven to rotate together with the connecting plate around the hinge shaft in the direction close to the seat (namely, the handle assembly is folded upwardly), thereby enabling the folding of the handle assembly relative to the support plate assembly. Moreover, the hinge shaft is arranged below the support plate assembly, such that when folding the folding scooter, the rotational axis of the handle assembly is located below the support plate assembly, thus ensuring that the handle assembly fits the support plate assembly closely. The scooter provided herein has a relatively flat structure and less space occupation in a folded state, facilitating the storage and transport.

BRIEF DESCRIPTION OF THE DRAWINGS

In order to illustrate the technical solutions in embodiments of the present disclosure or the prior art more clearly, the accompany drawings needed in the description of the embodiments of the disclosure or the prior art will be briefly introduced below. Obviously, presented in the accompany drawings are merely some embodiments of the present disclosure, and other accompany drawings can be obtained by those skilled in the art based on the drawings provided herein without paying creative effort.

Figure 1:
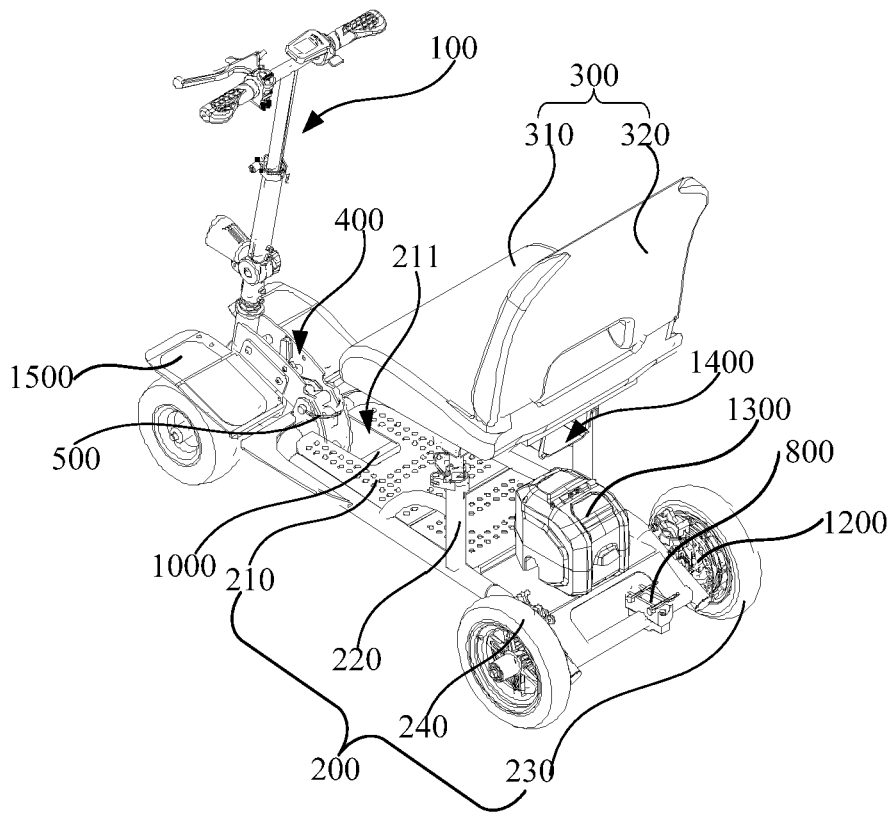
FIG. 1 is a structural diagram of a folding scooter according to one embodiment of the present disclosure in an unfolded state.
Figure 2:
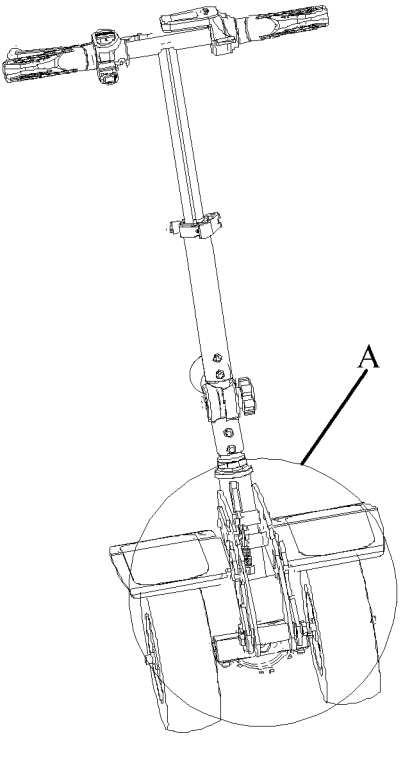
FIG. 2 schematically shows assembly of a handle assembly and a connecting assembly according to one embodiment of the present disclosure.

In the drawings: 100, handle assembly; 110, upright column; 111, upper column portion; 1111, first tubing component; 1112, second tubing component; 112, lower column portion; 113, fastening member; 120, handle; 130, first front wheel; 140, second front wheel; 150, first connecting member; 160, second connecting member; 200, support plate assembly; 210, support plate; 211, opening; 220, connection column; 230, first rear wheel; 240, second rear wheel; 300, seat; 310, seat base; 320, seat back; 400, connecting assembly; 410, first connecting plate; 420, hinge shaft; 430, fixing plate; 431, second connecting plate; 432, side plate; 440, fixing column; 441, clamping portion; 4411, first notch; 500, locking member; 510, pin shaft; 520, U-shaped safety lock; 600, spring damping plate; 700, lamp; 800, hanging assembly; 900, hook; 910, first through hole; 920, second notch; 930, second through hole; 1000, hanging rod; 1100, elastic member; 1200, driving member; 1300, mounting shell; 1400, insertion slot; and 1500, pedal fender.

The objectives, technical solutions and beneficial effects of the present disclosure will be further described below with reference to accompanying drawings and embodiments.

DETAILED DESCRIPTION OF EMBODIMENTS

Technical solutions of the present disclosure will be clearly and completely described below with reference to the embodiments and accompanying drawings. Obviously, described below are merely some embodiments of this disclosure, which are not intended to limit the disclosure. Other embodiments made by those skilled in the art based on the embodiments provided herein without paying any creative effort shall fall within the scope of the present disclosure.

It should be noted that directional indications, such as up, down, left, right, front and back, used herein are merely used to explain a relative positional relationship and movement among components in a particular posture, and if the particular posture changes, the directional indication changes accordingly. In addition, terms, such as "first" and "second", are illustrative, and should not be understood as indicating or implying a relative importance or the number of elements. Elements defined with "first" and "second" may explicitly or implicitly include at least one such element. Besides, the "and/or" used herein includes three solutions, for example, "A and/or B" includes A, B and a combination thereof. Additionally, technical solutions of various embodiments can be combined on the premise that the combined technical solution can be implemented by those skilled in the art. When the combination of technical solutions is contradictory or cannot be implemented, it should be considered that such a combination does not exist, and is not within the scope of the present disclosure defined by the appended claims.

The folding scooter designed herein will be described in detail below.

As shown in FIGS. 1-4, the folding scooter includes a handle assembly 100, a support plate assembly 200, a seat 300 and a connecting assembly 400. The seat 300 is detachably provided on the support plate assembly 200, and the connecting assembly 400 is configured to achieve the rotational connection between the handle assembly 100 and the support plate assembly 200. The connecting assembly 400 includes a first connecting plate 410, a hinge shaft 420 and a fixing plate 430. The hinge shaft 420 is located below the support plate assembly 200. The fixing plate 430 is fixedly arranged relative to the support plate assembly 200, and is connected to the hinge shaft 420. One end of the connecting plate 410 is connected to the handle assembly 100, and the other end of the connecting plate 410 is articulated to the hinge shaft 420. The handle assembly 100 can rotate with the connecting plate 410 around the hinge shaft 420 in a direction close to or away from the seat 300 to allow the folding or unfolding of the handle assembly 100 relative to the support plate assembly 200.

During the folding process of the folding scooter of this application, the seat 300 is removed firstly, and then the handle assembly 100 is driven to rotate together with the connecting plate 410 around the hinge shaft 420 in the direction close to the seat 300 (namely, the handle assembly 100 is folded upwardly), thereby enabling the folding of the handle assembly 100 relative to the support plate assembly 200. The hinge shaft 420 of this application is arranged below the support plate assembly 200, such that when folding the folding scooter, the rotational axis of the handle assembly 100 is located below the support plate assembly 200, thus ensuring that the handle assembly 100 fits the support plate assembly 200 closely. Therefore, the scooter has a relatively flat structure and less space occupation in a folded state, facilitating the storage and transport. With reference to FIGS. 1, 10, 11 and 12 for comparison, it can be demonstrated that the folding scooter of this application has a flat structure when folded, and it is convenient for packaging and storage in trunks for transport.

During the unfolding process of the folding scooter of this application, the handle assembly 100 is forced to rotate together with the connecting plate 410 around the hinge shaft 420 in the direction away from the seat 300 (namely, the handle assembly 100 is rotated downwardly), thereby realizing the unfolding of the handle assembly 100 relative to the support plate assembly 200. The seat 300 is then mounted on the support plate assembly 200 to ensure that the scooter is ready for normal use.

In this embodiment, when folding the scooter, the handle assembly 100 is driven to rotate together with the connecting plate 410 around the hinge shaft 420 in the direction close to the seat 300 by an angle of 90°, which enables the 90°-folding of the handle assembly 100 relative to the support plate assembly 200, ensuring the close fit between the handle assembly 100 and the support plate assembly 200.

Figure 3:
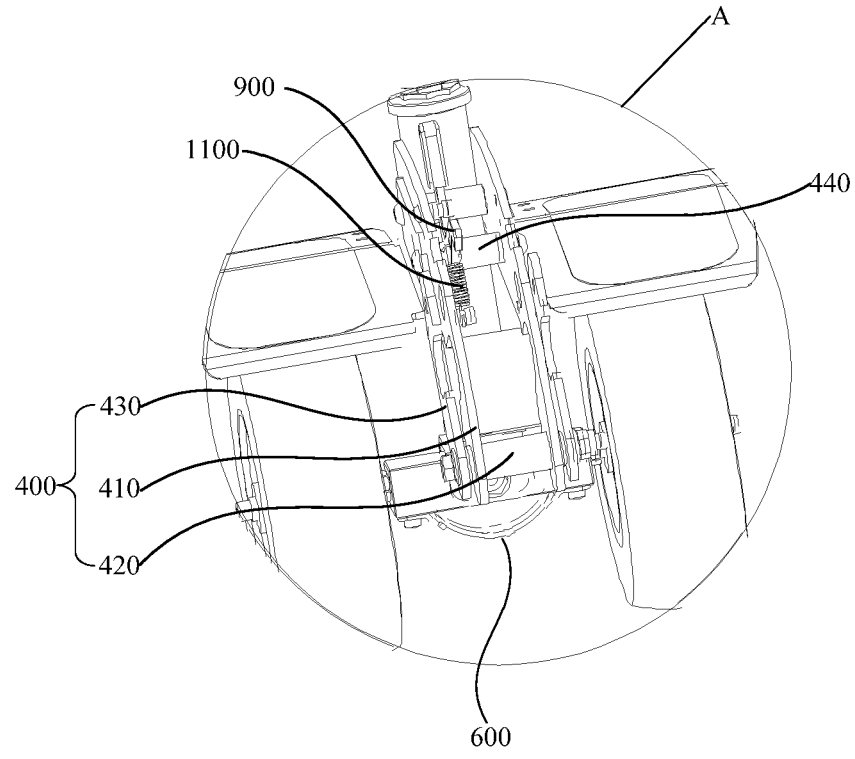
FIG. 3 is an enlarged view of portion "A" in FIG. 2.

Referring to FIG. 3, two first connecting plates 410 are provided spaced apart, allowing for more reliable connection between the handle assembly 100 and the hinge shaft 420.

Referring to FIG. 3, the two connecting plates 410 are arranged opposite to each other, and are connected via a fixing column 440.

Figure 4:
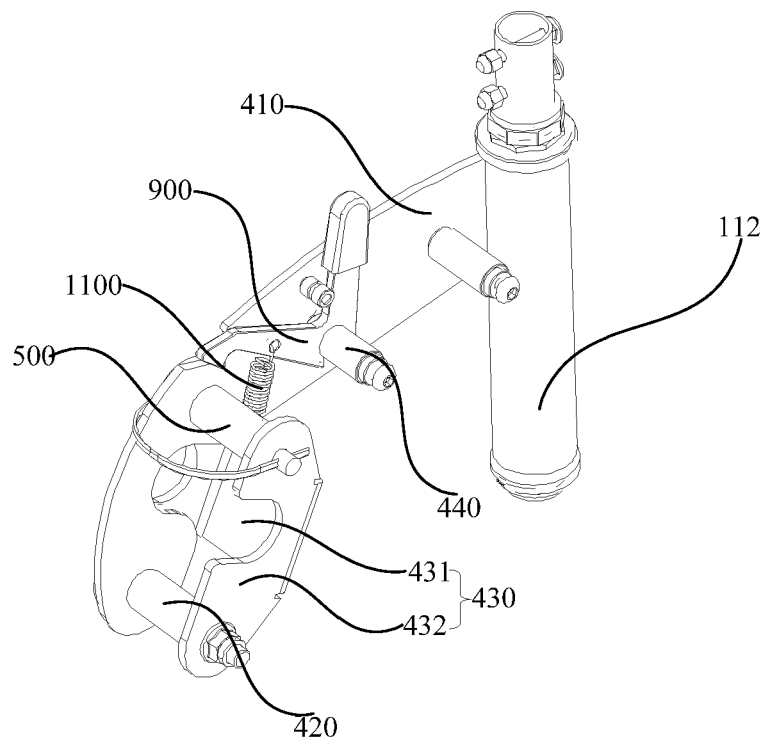
FIG. 4 is a structural diagram of the connecting assembly according to one embodiment of the present disclosure in the absence of a connecting plate.

Referring to FIGS. 3-4, the fixing plate 430 includes a second connecting plate 431 and two side plates 432 both connected with the second connecting plate 431. The two side plates 432 are respectively connected with two ends of the hinge shaft 420.

Referring to FIG. 1, the support plate assembly 200 is provided with an opening 211, and the connecting plate 410 passes through the opening 211 to be articulated with the hinge shaft 420. Accordingly, when the scooter is folded, the connecting plate 410 partially passes through the opening 211 to reach to a position below the support plate assembly 200, thereby further ensuring that the folded scooter is flatter and occupies less space. Specifically, the opening 211 is located at the end of the support plate assembly 200 close to the handle assembly 100.

Figure 5:
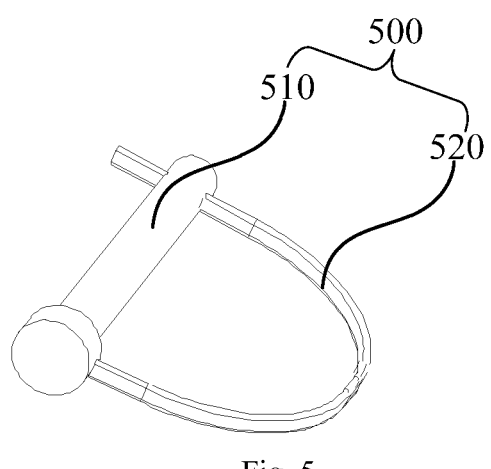
FIG. 5 is a structural diagram of a locking member according to one embodiment of the present disclosure.

Referring to FIGS. 1 and 5, the folding scooter further includes a locking member 500, which is configured to lock or unlock the first connecting plate 410 relative to the fixing plate 430. Specifically, when the folding scooter is normally used, the first connecting plate 410 is locked by the locking member 500 relative to the fixing plate 430, so as to prevent the first connecting plate 410 from rotating. At this time, the scooter cannot be folded. When the folding scooter is required to be folded, the locking member 500 will release the locking of the connecting plate 410 relative to the fixing plate 430, such that the handle assembly 100 can be driven to rotate together with the first connecting plate 410 around the hinge shaft 420 in the direction close to the seat 300 so as to implement the folding of the handle assembly 100 relative to the support plate assembly 200.

Referring to FIGS. 4-5, the locking member 500 is a D-shaped pin, which includes a pin shaft 510 and a U-shaped safety lock 520. The pin shaft 510 is configured to pass through the first connecting plate 410 and the fixing plate 430 in sequence. One end of the U-shaped safety lock 520 is connected to a rear end of the pin shaft 510, and the other end of the U-shaped safety lock 520 passes through the front end of the pin shaft 510. Specifically, in normal use, the pin shaft 510 passes through the first connecting plate 410 and the fixing plate 430 in sequence, and an end of the U-shaped safety lock 520 passes through the front end of the pin shaft 510, thereby achieving the locking of the first connecting plate 410 relative to the fixing plate 430. When folding the scooter, the D-shaped pin is removed. Specifically, one end of the U-shaped safety lock 520 is withdrawn from the front end of the pin shaft 510, and then the pin shaft 510 is withdrawn from the first connecting plate 410 and the fixing plate 430, thus achieving the unlocking of the first connecting plate 410 relative to the fixing plate 430.

Figure 6:
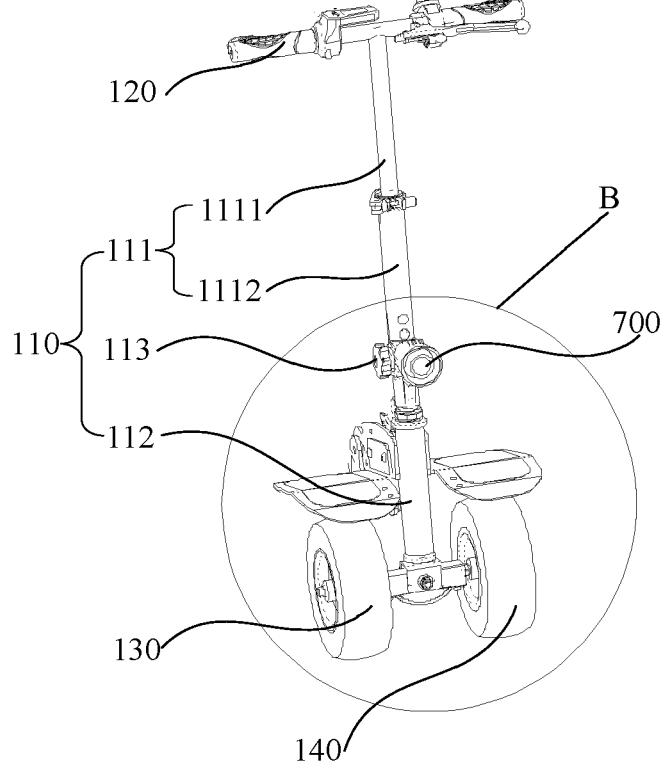
FIG. 6 is a structural diagram of the handle assembly according to one embodiment of the present disclosure.

Referring to FIGS. 1 and 6, the handle assembly 100 includes an upright column 110, a handle 120 provided on the upright column 110, a first front wheel 130 and a second front wheel 140 that are both rotationally disposed at the bottom of the upright column 110. The end of the first connecting plate 410 away from the hinge shaft 420 is connected to the upright column 110.

Figure 7:
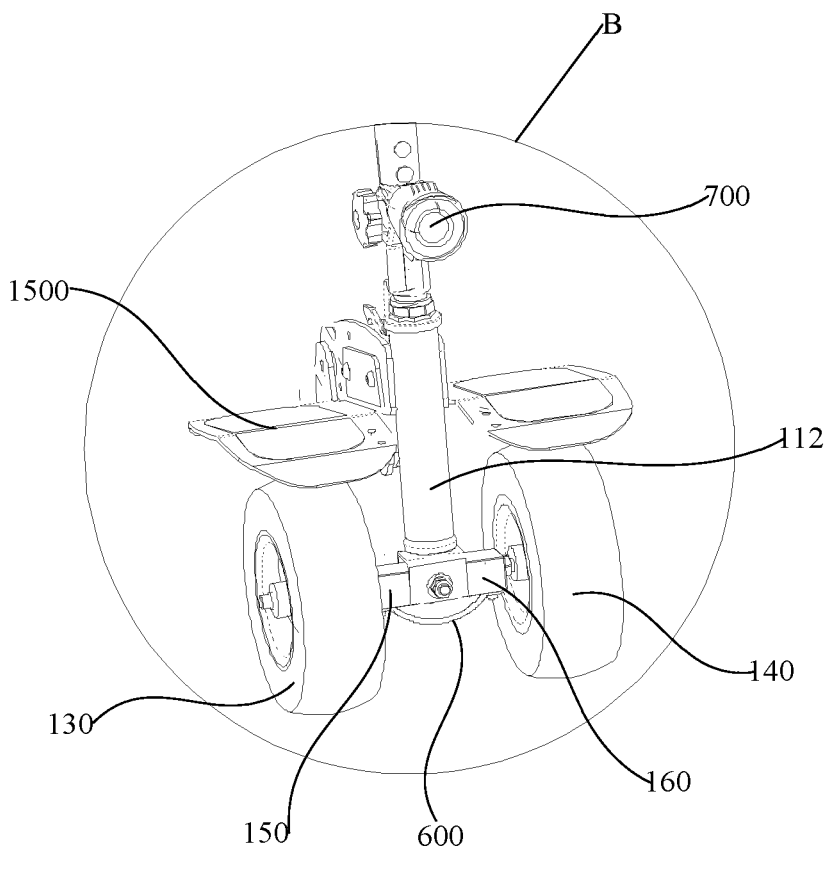
FIG. 7 is an enlarged view of portion "B" in FIG. 6.

Referring to FIGS. 6-7, the handle assembly 100 further includes a first connecting member 150 and a second connecting member 160, which are articulated to the bottom of the upright column 110, respectively. An axis of the first connecting member 150 and an axis of the second connecting member 160 are each at a certain angle to the axis of the upright column 110. The first front wheel 130 is rotationally arranged at the first connecting member 150, and the second front wheel 140 is rotationally arranged at the second connecting member 160. Specifically, as the first connecting member 150 and the second connecting member 160 each are articulated to the bottom of the upright column 110, when the scooter turns, the first connecting member 150 drives the first front wheel 130 to rotate upwardly and downwardly relative to the upright column 110, or the second connecting member 160 drives the second front wheel 140 to rotate upwardly and downwardly relative to the upright column 110, so as to adjust the height of the first front wheel 130 or the second front wheel 140, thereby ensuring that the first front wheel 130 or the second front wheel 140 is in reliable contact with the ground and avoiding rollovers. In this embodiment, when the scooter is normally placed on the ground, axes of the first connecting member 150 and the second connecting member 160 are both perpendicular to the axis of the upright column 110.

Referring to FIGS. 6-7, the folding scooter further includes a spring damping plate 600, where one end of the spring damping plate 600 is connected with the first connecting member 150, and the other end of the spring damping plate 600 is connected with the second connecting member 160. Specifically, the two front wheels of this application are independent of each other. When the scooter turns or bumps, at least one of the two front wheels leaves the ground, resulting in different relative heights of the two front wheels. In this case, the spring damping plate 600 is pulled to prevent the difference between relative heights of the two front wheels so as to play the role of vibration damping to weaken the bumping of the folding scooter, providing a more comfortable riding experience for users.

Referring to FIGS. 1 and 6, the upright column 110 includes a fastening member 113, an upper column portion 111 and a lower column portion 112. The upper column portion 111 is articulated to the lower column portion 112. The handle 120 is provided on the upper column portion 111, and the first front wheel 130 and the second front wheel 140 are rotationally disposed at the bottom of the lower column portion 112. The upper column portion 111 is configured to rotate in the direction close to or away from the seat 300 relative to the lower column portion 112 so that the handle 120 is close to or away from the seat 300. The fastening member 113 is configured for locking and unlocking the upper column portion 111 relative to the lower column portion 112. Specifically, the distance between the handle 120 and the seat 300 can be reasonably arranged to fit users varying in arm length. For instance, if the user has a shorter arm, the locking of the upper column portion 111 relative to the lower column portion 112 can be released by means of the fastening member 113 to drive the upper column portion 111 to rotate relative to the lower column portion 112 in the direction close to the seat 300. That is, the upper column portion 111 tilts together with the handle 120 towards the seat 300 to make the handle 120 close to the seat 300. Then the upper column portion 111 is locked relative to the lower column portion 112 using the locking member 113, such that the users can hold the handle bar 120 more easily and conveniently when sitting on the seat 300.

Referring to FIG. 6, the upper column portion 111 includes a first tubing member 1111 and a second tubing member 1112. The handle 120 is provided on the first tubing member 1111, and the second tubing member 1112 is articulated to the lower column portion 112. The first tubing member 1111 partially extends into the second tubing member 1112, and is capable of being lifted and lowered relative to the second tubing member 1112 to adjust the height of the upper column portion 111, thereby adjusting the height of the handle 120. Specifically, users can adjust the height of the handle 120 according to their heights or preferences for a more comfortable use experience.

Referring to FIG. 6, the lower column portion 112 is provided with a lamp 700 to enhance the illumination under a bad light condition.

Furthermore, the folding scooter also includes a horn. In this embodiment, the horn is integrated into the lamp 700 to save space, and the lamp 700 can be also used to alert pedestrians in addition to the lighting function.

Referring to FIG. 1, the end of the support plate assembly 200 away from the handle assembly 100 is provided with a hanging assembly 800, which is configured for connection with external transport structures. Specifically, the end of the support plate assembly 200 away from the handle assembly 100 refers to the tail end of the support plate assembly 200, and the external transport structures may be, but are not limited to, a light trailer. The hanging assembly 800 makes it convenient for the folding scooter of this application to be connected with the external transport structures such as a light trailer and thus to drive the motion of the external transport structures, facilitating the transportation of goods.

Referring to FIGS. 1, 3 and 4, the folding scooter further includes a hook 900 and a hanging rod 1000. The hook 900 is connected to the first connecting plate 410, and the hanging rod 1000 is connected to the bottom of the support plate assembly 200. The hook 900 is configured to be hung on the hanging rod 1000 when the handle assembly 100 is folded relative to the support plate assembly 200. Specifically, after the folding scooter is folded, the handle assembly 100 is pressed downwardly and then the hook 900 is engaged with the hanging rod 1000, thereby locking the scooter and maintaining the scooter in a folded state. The hook 900 and the hanging rod 1000 both have a simple structure.

Referring to FIGS. 3-4, in this embodiment, the hook 900 is connected to the first connecting plate 410 through the fixing column 440, and specifically, the hook 900 is fastened on the fixing column 440.

Figure 8:
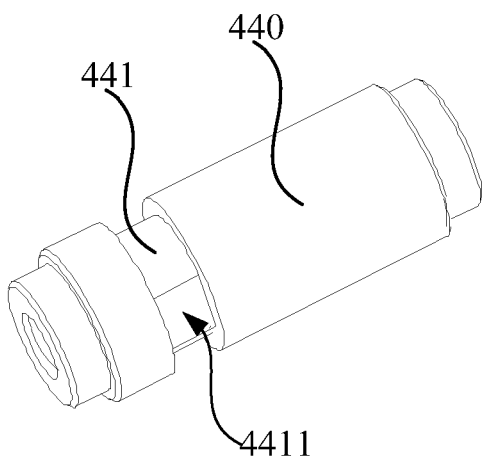
FIG. 8 is a structural diagram of a fixing column according to one embodiment of the present disclosure.

Referring to FIG. 8, a periphery of the fixing column 440 is arranged with a ring-shaped groove to form a clamping portion 441 with a first side and a second side opposite to each other. The first side and the second side of the clamping portion 441 each is provided with a first notch 4411. The hook 900 is provided with a first through hole 910, whose diameter fits the outer diameter of the clamping portion 441. The hook 900 is also provided with a second notch 920 communicated with the first through hole 910. The size of the second notch 920 is smaller than the outer diameter of the clamping portion 441, and is adapted to the distance between the first side and the second side of the clamping portion 441. Specifically, when the hook 900 is engaged with the fixing column 440, the clamping portion 441 passes through the second notch 920 to extend into the first through hole 910 to fit the first through hole 910. Then the hook 900 is rotated relative to the fixing column 440 so that the second notch 920 of the hook 900 is engaged with the first notch 4411 of the clamping portion 441 to prevent the hook 900 from falling off from the fixing column 440. The hook 900 is not completely fixed on the fixing column 440, and thus it can be easily replaced.

Figure 9:
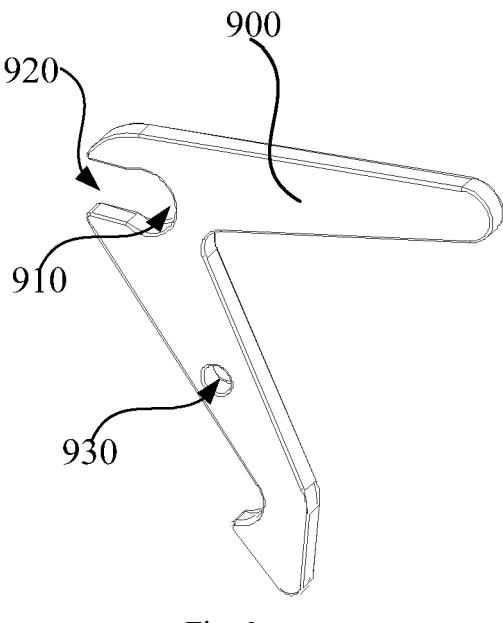
FIG. 9 is a structural diagram of a hook according to one embodiment of the present disclosure.
Figure 10:
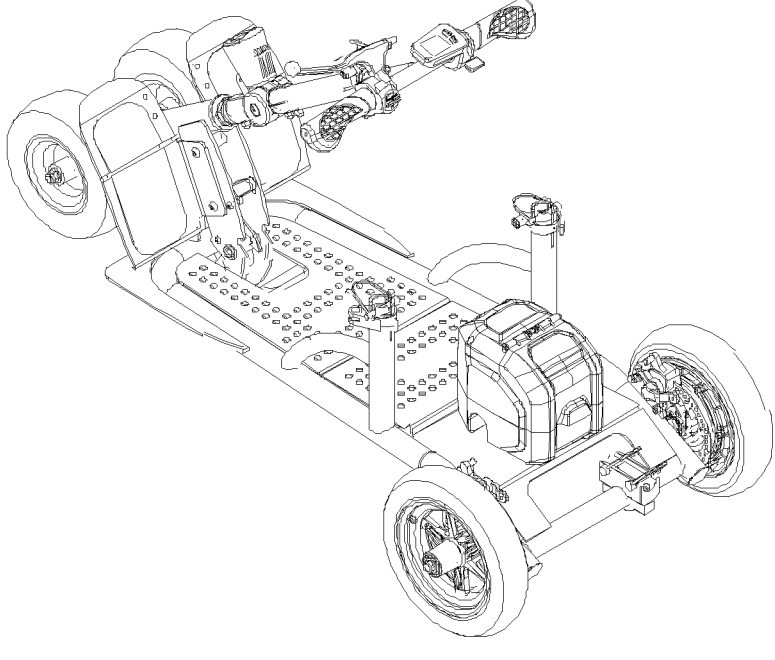
FIG. 10 is a structural diagram of the folding scooter when being folded according to one embodiment of the present disclosure.
Figure 11:
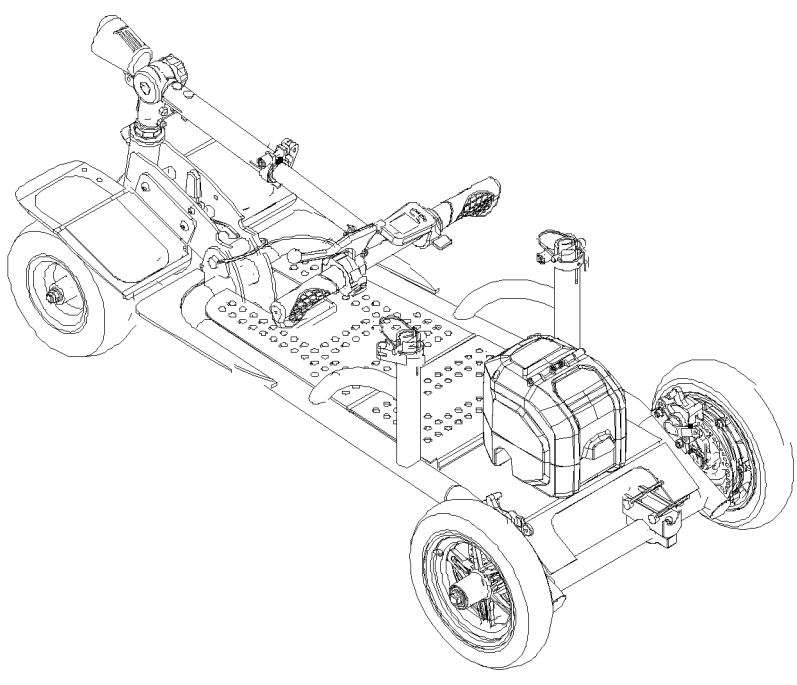
FIG. 11 is a structural diagram of the folding scooter according to one embodiment of the present disclosure after the handle is folded.
Figure 12:
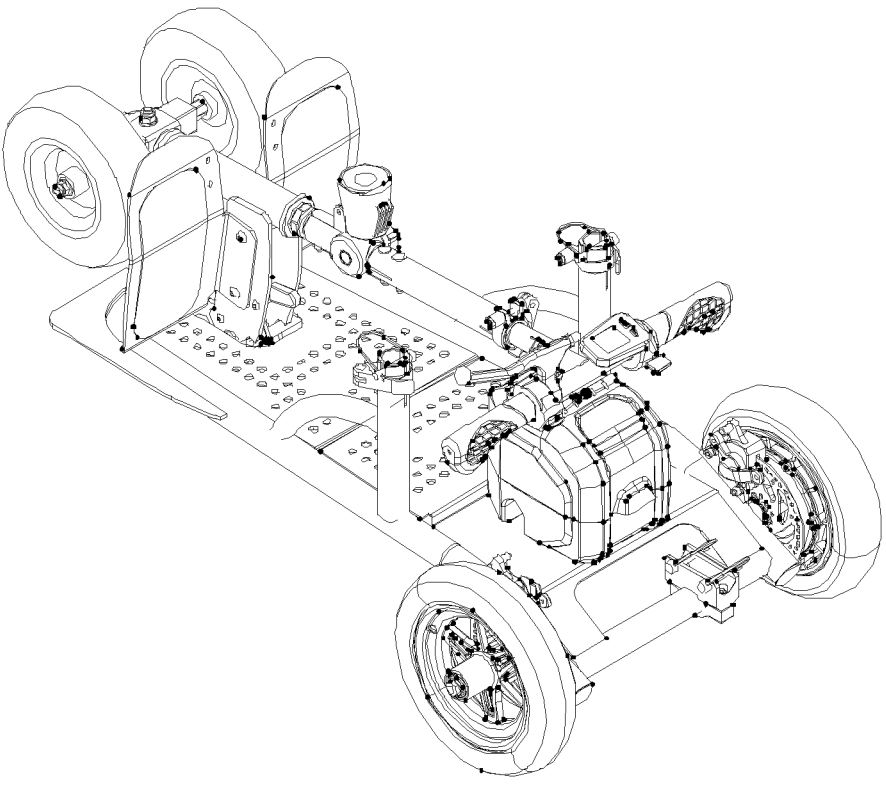
FIG. 12 is a structural diagram of the folding scooter according to one embodiment of the present disclosure after folding the handle assembly and pedal fenders.

Referring to FIG. 9, the hook 900 is provided with a second through hole 930. The folding scooter further includes an elastic member 1100, where one end of the elastic member 1100 is connected to the first connecting plate 410, and the other end of the elastic member 1100 is hung at the second through hole 930. Specifically, after the scooter is folded, the elastic member 1100 applies an elastic force to the hook 900 to ensure that the hook 900 is reliably hung on the hanging rod 1000. In this embodiment, the elastic member 1100 is a spring.

Referring to FIG. 9, the hook 900 is approximately V-shaped, and the first through hole 910 and the second notch 920 are located at the corner of the hook 900 with a V-shaped structure.

Referring to FIG. 1, the support plate assembly 200 includes a support plate 210, a connection column 220, a first rear wheel 230 and a second rear wheel 240. The first rear wheel 230 and the second rear wheel 240 are rotationally provided at the bottom of the upright column 110. The hinge shaft 420 is located below the support plate 210. The fixing plate 430 is fixedly provided relative to the support plate 210, and the seat 300 is detachably provided on the connection column 220. Specifically, the number of the connection column 220 is two, and the two connection columns 220 can support the seat 300 more reliably. In this embodiment, the opening 211 is provided on the support plate 210. In this embodiment, the folding scooter has two front wheels and two rear wheels, and the four-wheel design can enhance the overall riding stability.

Furthermore, the scooter also includes a driving member 1200 connected with the first rear wheel 230. The number of the driving member 1200 is one, and the driving member 1200 is merely configured for driving the first rear wheel 230 to rotate. Specifically, the driving member 1200 is capable of rotating around its own axis to drive the first rear wheel 230 to rotate, thereby driving the motion of the entire scooter. When the scooter is driven to move, the second rear wheel 240, the first front wheel 130 and the second front wheel 140 will rotate with the first rear wheel 230. The scooter provided has a single-rear wheel drive mode, in which it does not require a differential to regulate the speed difference between two rear wheels like the existing double-rear wheel drive, and does not require multiple driving members 1200, reducing the overall weight and production cost.

In one embodiment, the first rear wheel 230 is the right rear wheel, and in other alternative embodiments, the first rear wheel 230 may also be a left rear wheel.

In one embodiment, the driving member 1200 is a hub motor, which hardly produces noise during the operation and has a strong power. The hub motor includes a rotor and a stator that are rotationally connected. The stator is fixedly provided on the support plate assembly 200, and the rotor is connected to the inner wall of the first rear wheel 230. The rotor is capable of rotating relative to the stator, thereby driving the first rear wheel 230 to rotate synchronously.

Referring to FIG. 1, the seat 300 includes a seat base 310 and a seat back 320, and the seat base 310 is at an angle to the seat back 320. Specifically, the seat back 320 is configured such that the users can lean on the seat back 320 while sitting on the seat base 310.

In one embodiment, the seat back 320 is rotationally connected to the seat base 310, and can rotate relative to the seat base 310 so as to adjust the angle between the seat base 310 and the seat back 320, thus achieving the folding or unfolding of the seat back 320. Specifically, when the folding scooter is not in use, the seat back 320 may be folded to reduce the space occupation.

Furthermore, the scooter also includes a power supply, which is provided at the tail of the support plate 210, and is electrically connected to the driving member 1200 for supplying power to the driving member 1200. In this embodiment, the power supply is a lithium battery.

As shown in FIG. 1, the scooter further includes a mounting shell 1300 provided at the tail of the support plate 210, and the mounting shell 1300 can accommodate and protect the power supply.

As shown in FIG. 1, an insertion slot 1400 is provided below the seat 300 to accommodate a power supply as a backup power supply. Specifically, when the users cannot charge the power supply in time or when the original power supply fails, the backup power supply can be inserted into the insertion slot 1400 to power the scooter.

As shown in FIG. 1, the scooter further includes a pedal fender 1500 provided on the handle assembly 100 and above the first front wheel 130 and the second front wheel 140. Specifically, the pedal fender 1500 can avoid the first front wheel 130 and the second front wheel 140 from splashing mud onto the user when traveling on a muddy road.

As shown in FIG. 1, the number of the pedal fender 1500 is two, where one of the two pedal fenders 1500 is arranged above the first front wheel 130 and the other one is arranged above the second front wheel 140. Specifically, the pedal fender 1500 also serves as a footrest for users. When the users sit on the seat 300, the pedal fenders 1500 are located in front of the users, and thus the users can stretch their legs conveniently to reach a comfortable riding.

Described above are merely preferred embodiments of this application, which are not intended to limit the scope of this application. It should be understood that any variations, modifications and replacements made by those skilled in the art without departing from the spirit of this application shall be included in the scope of this application defined by the appended claims.

What is claimed is:

1. A folding scooter, comprising:
a handle assembly;
a support plate assembly;
a seat; and
a connecting assembly;
wherein the seat is detachably provided on the support plate assembly;
the connecting assembly is configured to achieve rotational connection between the handle assembly and the support plate assembly; the connecting assembly comprises a connecting plate, a hinge shaft and a fixing plate; the hinge shaft is located below the support plate assembly; the fixing plate is fixedly arranged relative to the support plate assembly, and is connected to the hinge shaft; and a first end of the connecting plate is connected to the handle assembly, and a second end of the connecting plate is articulatedly connected to the hinge shaft;

the handle assembly is configured to rotate around the hinge shaft with the connecting plate in a direction close to or away from the seat to allow folding or unfolding of the handle assembly relative to the support plate assembly; and the support plate assembly is provided with an opening; and the connecting plate passes through the opening to be articulatedly connected with the hinge shaft.

2. The folding scooter of claim 1, wherein a number of the connecting plate is two, and the two connecting plates are arranged spaced apart.

3. The folding scooter of claim 1, further comprising:
a locking member;
wherein the locking member is configured to lock or unlock the connecting plate relative to the fixing plate.

4. The folding scooter of claim 1, wherein the handle assembly comprises an upright column, a handle provided on the upright column, a first front wheel and a second front wheel; the first front wheel and the second front wheel are both rotationally provided at a bottom of the upright column; and an end of the connecting plate away from the hinge shaft is connected to the upright column.

5. The folding scooter of claim 4, wherein the handle assembly further comprises a first connecting member and a second connecting member; the first connecting member and the second connecting member are articulatedly connected to the bottom of the upright column, respectively; an axis of the first connecting member and an axis of the second connecting member are respectively at an angle to an axis of the upright column; and the first front wheel is rotationally arranged at the first connecting member, and the second front wheel is rotationally arranged at the second connecting member.

6. The folding scooter of claim 5, further comprising:
a spring damping plate;
wherein a first end of the spring damping plate is connected to the first connecting member, and a second end of the spring damping plate is connected to the second connecting member.

7. The folding scooter of claim 4, wherein the upright column comprises a fastening member, an upper column portion and a lower column portion; the upper column portion is articulatedly connected with the lower column portion; the handle is provided on the upper column portion, and the first front wheel and the second front wheel are rotationally provided at a bottom of the lower column portion; the upper column portion is configured to rotate relative to the lower column portion in a direction close to or away from the seat so as to make the handle close to or away from the seat; and the fastening member is configured to achieve locking or unlocking of the upper column portion relative to the lower column portion.

8. The folding scooter of claim 7, wherein an end of the support plate assembly away from the handle assembly is provided with a hanging assembly; and the hanging assembly is configured for connection with an external transport structure.

9. The folding scooter of claim 8, further comprising:
a hook; and
a hanging rod;
wherein the hook is connected to the connecting plate; the hanging rod is connected to a bottom of the support plate assembly; and the hook is configured to be hung on the hanging rod when the handle assembly is folded relative to the support plate assembly.

\* \* \* \* \*